(12) United States Patent
Son

(10) Patent No.: US 11,796,409 B2
(45) Date of Patent: Oct. 24, 2023

(54) BOOTS DAMAGE DETECTION APPARATUS AND METHOD

(71) Applicant: HL MANDO CORPORATION, Pyeongtaek (KR)

(72) Inventor: MyungSeob Son, Seoul (KR)

(73) Assignee: HL MANDO CORPORATION, Changwon (KR)

(*) Notice: Subject to any disclaimer, the term of this patent is extended or adjusted under 35 U.S.C. 154(b) by 8 days.

(21) Appl. No.: 17/811,595

(22) Filed: Jul. 11, 2022

(65) Prior Publication Data

US 2023/0009255 A1 Jan. 12, 2023

(30) Foreign Application Priority Data

Jul. 12, 2021 (KR) .................. 10-2021-0091153

(51) Int. Cl.
*G01L 5/22* (2006.01)
*B62D 5/04* (2006.01)
*B62D 15/02* (2006.01)
*G01L 5/00* (2006.01)

(52) U.S. Cl.
CPC ............ *G01L 5/221* (2013.01); *B62D 5/0481* (2013.01); *B62D 15/021* (2013.01); *G01L 5/0042* (2013.01)

(58) Field of Classification Search
CPC ..... G01L 5/221; G01L 5/0042; B62D 5/0481; B62D 15/021; B62D 5/04; B62D 5/0403; B62D 5/0409; B62D 3/12; B62D 5/0421; B62D 7/16; F16J 3/041; F16J 15/3296; G01M 17/06
See application file for complete search history.

(56) References Cited

U.S. PATENT DOCUMENTS

| | | | |
|---|---|---|---|
| 10,775,261 B2* | 9/2020 | Haubenstricker | ... G01M 3/2869 |
| 11,247,721 B2* | 2/2022 | Larson | ........... G01M 3/3272 |
| 11,326,976 B2* | 5/2022 | Haubenstricker | ... G01M 17/007 |
| 2019/0250063 A1* | 8/2019 | Haubenstricker | ... B60R 16/0231 |
| 2021/0245802 A1* | 8/2021 | Larson | ........... G01M 3/3272 |

* cited by examiner

*Primary Examiner* — Freddie Kirkland, III
(74) *Attorney, Agent, or Firm* — Harvest IP Law, LLP

(57) ABSTRACT

The present disclosure relates to a boots damage detection apparatus and a method. More specifically, the boots damage detection apparatus according to the present disclosure includes: a transmitter that transmits a command current for a movement to a first rack position or a second rack position; a receiver that receives a rack position to which a movement is performed in accordance with the command current and a rack force corresponding to the rack position from a plurality of sensors; and a determiner that determines damage/non-damage of boots based on a first rack force corresponding to the first rack position and a second rack force corresponding to the second rack position.

12 Claims, 8 Drawing Sheets

BOOTS DAMAGE DETECTION APPARATUS AND METHOD

CROSS-REFERENCE TO RELATED APPLICATION

This application claims priority from Korean Patent Application No. 10-2021-0091153, filed on Jul. 12, 2021, which is hereby incorporated by reference for all purposes as if fully set forth herein.

BACKGROUND OF THE INVENTION

Field of the Invention

Embodiments relates to a boots damage detection apparatus and method for detecting a damage in boots.

Description of Related Art

A Steer-By-Wire (SBW) system of a vehicle represents a system that causes steering of the vehicle to be performed using an electric motor such as a motor instead of eliminating mechanical connecting device such as a steering column and a universal joint or a pinion shaft between a steering wheel and vehicle wheels.

In the SBW system, there is no mechanical connection between a steering rack gear and a steering column, and thus in order to allow a driver to have a steering feeling similar to that of an existing steering system, an appropriate steering reaction needs to be generated by a motor installed in a handle at the time of steering.

If a change in the output of the SbW system occurs, there is a problem in that a steering feeling felt by a driver becomes different from that before the change and thus, occurrence of wearing and deterioration of components need to be detected.

SUMMARY OF THE INVENTION

In such a background, the present disclosure provides a boots damage detection apparatus and a method for determining a damage in boots based on a rack force for a rack position.

In order to solve the problems described above, according to one aspect, the present disclosure provides a boots damage detection apparatus including: a transmitter that transmits a command current for a movement to a first rack position or a second rack position; a receiver that receives a rack position to which a movement is performed from a plurality of sensors and a rack force corresponding to the rack position from a rack force sensor; and a determiner that determines damage/non-damage of boots based on a first rack force corresponding to the first rack position and a second rack force corresponding to the second rack position. According to another aspect, the present disclosure provides a boots damage detection method including: transmitting a command current for a movement to a first rack position or a second rack position; receiving a rack position to which a movement is performed in accordance with the command current and a rack force corresponding to the rack position from a plurality of sensors; and determining damage/non-damage of boots based on a first rack force corresponding to the first rack position and a second rack force corresponding to the second rack position.

According to a boots damage detection apparatus and a method of the present disclosure, by comparing rack forces corresponding to specific rack positions, damage/non-damage of boots in a mechanically-separated SbW system can be determined.

DETAILED DESCRIPTION OF THE INVENTION

Figure 1:
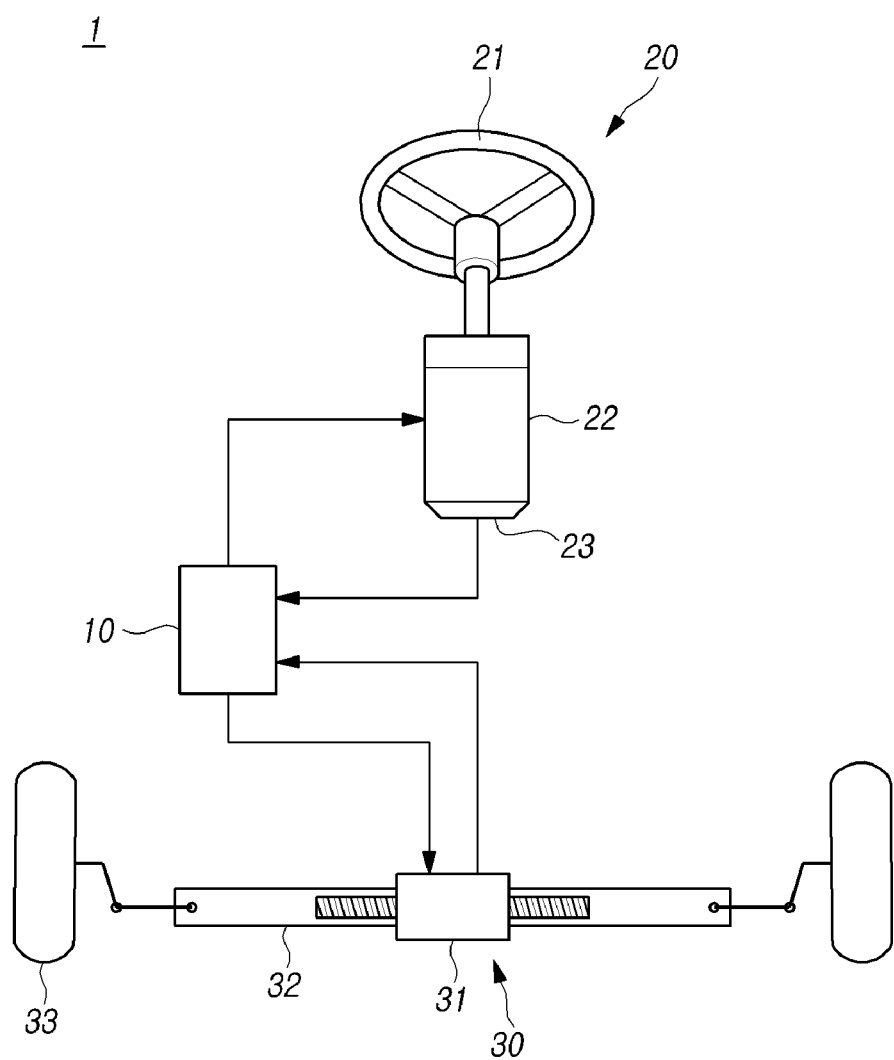
FIG. 1 is a block diagram illustrating a steering assist system according to one embodiment.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, a boots damage detection apparatus (10) according to one embodiment of the present disclosure will be described with reference to the attached drawings.

FIG. 1 is a block diagram illustrating a steering assist system (1) according to one embodiment.

The steering assist system (1) may be classified into hydraulic power steering (HPS) providing a steering assist force by generating a hydraulic pressure by rotating a pump, electronic power steering (EPS) providing a steering assist force by driving a motor, and the like in accordance with a driving system. Hereinafter, in description here, for the convenience of description, although the present disclosure will be described with reference to a steering assist system (1) of the electronic power steering, the steering assist system is not limited thereto.

In accordance with whether or not a steering input actuator (20) and a steering output actuator (30) are coupled using a mechanical connecting member (for example, a linkage), the steering assist system (1) may be a mechanical steering assist system (1) in which a force (torque) generated by a driver rotating a steering wheel (21) is transmitted to a steering motor (23) through a mechanical power transmission device (for example, a linkage or the like), and wheels (33) are steered in accordance with driving of the steering motor (23) or a Steer-by-Wire (SbW) system in which power is transmitted by transmitting and receiving electric signals through wires, cables, and the like in place of a mechanical power transmission device. Hereinafter, although the steering assist system (1) will be described with reference to the SbW system, the configuration is not limited thereto.

A steering assist system (1) according to the present disclosure illustrated in FIG. 1 may include a steering input actuator (20), a boots damage detection apparatus (10), a steering output actuator (30), and the like. As described above, in a case where the steering auxiliary system (1) is the SbW system, the steering input actuator (20) and the steering output actuator (30) may be mechanically separated from each other.

The steering input actuator (20) may represent a device to which steering information intended by a driver is input. Such a steering input actuator (20), as described above, may include a steering wheel (21), a steering shaft (22), and a reaction motor (23) and may further include a steering angle sensor, a steering torque sensor, and the like.

The reaction motor (23) may receive a control signal (or referred to as a command current) from the boots damage detection apparatus (10) as an input and apply a reaction force to the steering wheel (21). More specifically, the reaction motor (23) may receive a command current from the boots damage detection apparatus (10) as an input and generate a reaction torque by being driven at a rotation speed instructed using the command current.

The boots damage detection apparatus (10) may receive steering information from the steering input actuator (20) as an input, determine a control value, and output an electrical signal indicating the control value to the steering output actuator (30). Here, the steering information may represent information including at least one of a steering angle or a driver torque (or referred to as a steering torque).

The boots damage detection apparatus (10) may receive power information that is actually output from the steering output actuator (30) as a feedback, determine a control value, and output an electrical signal indicating the control value to the steering input actuator (20), thereby being able to provide a steering feeling for a driver.

Such a boots damage detection apparatus (10) may be realized using an electronic control unit (ECU), a microcomputer, or the like.

In one embodiment, a computer system (not illustrated) such as the boots damage detection apparatus (10) may be realized using an electronic control unit (ECU). The electronic control unit may include at least one or more elements among one or more processors, a memory, a storage, a user interface inputter, and a user interface outputter, and these elements may communicate with each other through a bus. The computer system may further include a network interface for connection to a network. The processor may be a CPU or a semiconductor element that executes process commands stored in the memory and/or the storage. The memory and the storage may include various types of volatile/nonvolatile storage media. For example, the memory may include a ROM and a RAM.

As one example, the steering output actuator (30) may represent a device drives a host vehicle to be actually steered. Such a steering output actuator (30) may further include a steering motor (31), a rack (32), wheels (33), and the like and may further include a vehicle-speed sensor, a rack position sensor, and the like.

As one example, the steering motor (31) may be electrically connected to the rack (32) and may provide power required for moving the rack (32) in an axial direction. More specifically, the steering motor (31) may be driven in accordance with an input of a command current from the boots damage detection apparatus (10) and cause the rack (32) to linearly move in the axial direction.

As one example, the rack (32) may have a structure in which both ends are physically connected to one wheel (33). Power generated in accordance with a linear movement of the rack (32) may be transmitted to the wheel (33) through such a physical connecting structure, and steering of the wheel (33) may be performed based on the power transmitted from the rack (32).

Although not illustrated, the steering assist system (1) according to one embodiment may further include a clutch that is able to separate or couple the steering input actuator (20) and the steering output actuator (30) and the like. Here, the clutch may be operated under the control of the boots damage detection apparatus (10).

In a case where the steering assist system (1) according to the present disclosure is the SbW system, and the host vehicle travels in an autonomous traveling mode, the steering assist system (1) according to one embodiment may perform steering control of the host vehicle by controlling only the steering output actuator (30) or may perform steering control of the host vehicle by controlling both the steering input actuator (20) and the steering output actuator (30).

Figure 2:
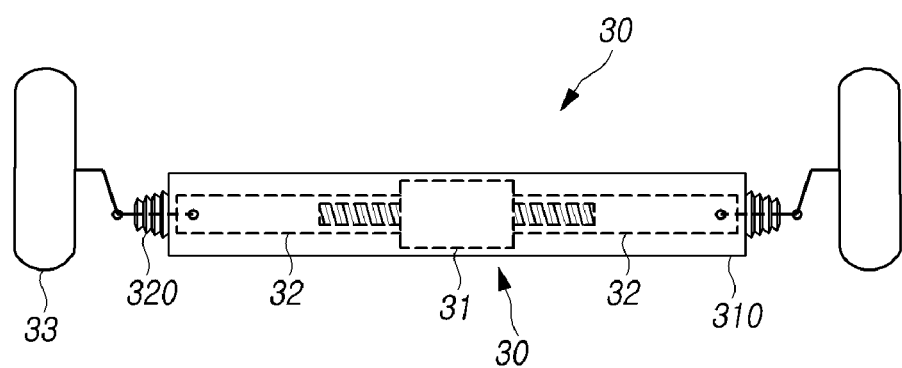
FIG. 2 is a diagram illustrating a steering output actuator according to another embodiment.

FIG. 2 is a diagram illustrating a steering output actuator (30) according to another embodiment.

Referring to FIG. 2, the steering output actuator (30) may include components that are common to the steering output actuator (30) illustrated in FIG. 1. For example, the steering output actuator (30) may include a steering motor (31), a rack (32), wheels (33), and the like that are the same as the components of the steering output actuator (30) illustrated in FIG. 1.

The steering output actuator (30) may further include a rack housing (310) and boots (320). Here, the rack housing (310) may be defined to represent a predetermined space surrounding the rack (32) inside the steering output actuator. In other words, the rack (32) may be configured to be included inside the rack housing (310).

The boots (320) are components installed at portions at which both ends of the rack (32) and each wheel (33) are connected and may have a structure that is able to block an inflow of external dusts, moistures, and the like through the connecting portions.

For example, the boots (320) may have high molecular substances having elasticity contained in the material thereof and configured to have a contractable/extendable form in accordance with movement of the rack (32) and the wheel (33).

As a specific example, the steering output actuator (30) may further include a rack housing (310) enclosing the rack (32) and boots (320) that are mounted to both ends of the rack housing (310) and are provided in a bellows rubber form.

By further including the rack housing (310) and the boots (320), the steering output actuator (30) can prevent foreign materials such as moistures from entering the rack (32), the steering motor (31), ball screws, and bearings.

Figure 3:
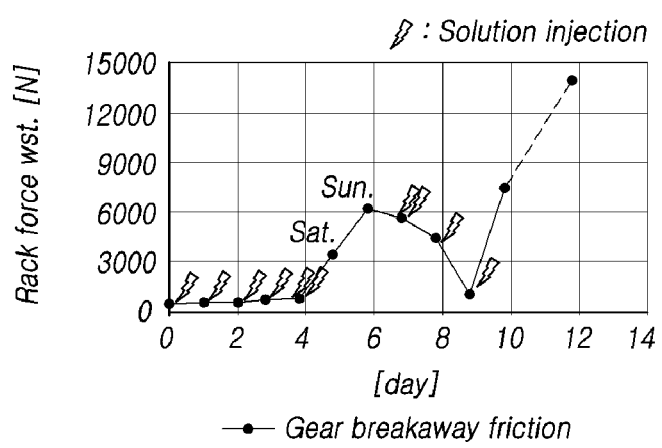
FIG. 3 is a graph illustrating a friction change caused by an inflow of moisture into the inside of boots according to one embodiment.

FIG. 3 is a graph illustrating a friction change caused by an inflow of moisture into the inside of the boots (320) according to one embodiment.

Depending on situations, in the process of continuous steering of a vehicle, boots cuts such as tearing-out, wearing, and the like of the boots (320) may occur. In a case where a steering apparatus is driven in a state in which the boots (320) are damaged, moisture, dust, and the like may flow into the inside of the boots (320) in the process of driving.

In this way, in a case where damages of the boots (320) and an inflowing state of moisture and the like according to the damages continue, rust, corrosion, and the like may be formed in connection parts between the rack (32) and the wheel (33) and the like that have been protected by the boots (320). In accordance therewith, in a case where the steering motor (31) starts to be driven from a stop state, friction of gears may relatively increase.

In such a case, friction may be measured using measurement of a rack force applied to the gear of the rack (32). The friction may be measured using a method of determining a gear friction average of the entire vehicle operating process or a method of measuring a gear breakaway friction measured in the case of switching from a non-driven state to a driven state.

Depending on situations, a degree of increase in the friction due to formation of rust or corrosion may be different between static friction and kinetic friction. For example, in a case where friction increases due to occurrence of corrosion, the static friction increases relatively much, and the kinetic friction increases relatively less.

As one example, referring to a test result illustrated in FIG. 3, breakaway friction measured at the time of switching from a non-driven state to a driven state may be measured to have a value larger than that of kinetic friction measured in a state in which steering is continuously performed in accordance with traveling of a vehicle after driven.

For example, in a case in which traveling of a vehicle is performed for a predetermined time or more, a time interval in which breakaway friction is applied may be markedly shorter than a time interval in which kinetic friction is applied. In accordance with this, in a case where an average value of magnitudes of friction applied during traveling of a vehicle is determined, even if a difference between the magnitude of the breakaway friction and the magnitude of the kinetic friction is large, a value close to the kinetic friction can be determined.

Hereinafter, in consideration of the points described above, gear breakaway friction will be assumed to be static friction, and the gear friction average is a value approximated to kinetic friction in description.

As in the test according to one embodiment illustrated in FIG. 3, in a case where gear part friction of the rack (32) is measured in the unit of one day in the process of traveling of the vehicle, even if the gear breakaway friction increases, an influence on the gear friction average may be relatively very low. Referring to FIG. 3, in a case where a vehicle is repeated to be driven and stop in a state in which moisture is injected into the inside of the steering output actuator (30) according to one embodiment, rust may be formed in accordance with elapse of time, and the breakaway friction of the steering output actuator (30) may increase in accordance therewith.

According to one embodiment, a test for evaluating a tendency of increases in formation of rust and friction can be performed by assuming a situation in which the boots of the steering output actuator (30) are damaged, and moisture penetrates thereinto.

For example, a test for measuring friction applied to the rack (32) while a predetermined amount of moisture is injected into the boots (320) at both ends of the rack (32) of the steering output actuator (30), and an operation for 4 hours and waiting for 20 hours are repeated in the unit of one day can be performed.

In this case, measurement of friction may be performed using a method of measuring both a gear friction average of the entire vehicle operating process and gear breakaway friction of a case of switching from the non-driven state to the driven state.

In the example described above, the test may be performed using a method in which vehicle running and waiting are performed after injection of moisture from the 1st day to the 4th day, vehicle running and waiting are performed without injection of moisture on the 5th day and the 6th day, and, on the 7th day and thereafter, moisture is injected again, and, vehicle running and waiting are performed.

According to the graph illustrated in FIG. 3, it can be checked that, although a change in the breakaway friction is not large until the 4th day on which the injected moisture remains even if moisture is injected, the breakaway friction rapidly increases on the 5th day and the 6th day on which no moisture is injected, that is, on Saturday and Sunday. Then, it can be checked that the breakaway friction decreases on the 7th day and the 8th day on which the moisture injection is restarted and then rapidly increases on the 9th day and thereafter.

Depending on situations, although corrosion of a component may progress also in a case where moisture is continuously injected, the corrosion may progress also in the process of natural dry in accordance with no injection of moisture for a predetermined period after injection of a predetermined amount of moisture. After that, in a case where moisture is injected again, the corrosion that has already progressive may be intensified. Such a corrosion process of a component may generally occur in the process of operating a vehicle.

As one example, as illustrated in the test result of FIG. 2, after start of injection of moisture into the inside of the boots (320) in the unit of one day, while corrosion of components inside the boots (320) may not progress much in the period of the 1st day to the 4th day that is an initial period, corrosion may progress in accordance with natural dry of the moisture injected during the period of the 1st day to the 4th day in the period of the 5th day to the 6th day, and the corrosion may be intensified in accordance with injection of moisture again on the 7th day and thereafter.

In accordance with this, in the period of the 1st day to the 4th day, in a case where the occurrence of corrosion is not relatively severe, and the injected moisture remains, a large difference between breakaway friction and kinetic friction may not be exhibited. On the other hand, in the period of the 5th day to the 6th day in which the injected moisture is dried, even in the case of corrosion that is not relatively severe, the breakaway friction may greatly increase. In addition, at least on the 9th day and thereafter, the corrosion is intensified, and the breakaway friction may greatly increase even in a case where moisture remains.

To sum up, in a case where the boots (320) are damaged, and foreign materials such as moisture and the like are injected into the inside of the rack housing (310) and the damaged boots (320), corrosion of internal components may progress, and breakaway friction of gear may greatly increase.

By referring to the test result described above, in accordance with corrosion due to injection of moisture into the inside of the boots (320) being intensified at least on the 9th day and thereafter, differently from the period of the 1st day to the 4th day in which corrosion is not relatively severe, the breakaway friction may rapidly increase even in a state in which moisture remains.

In this way, in a case where the breakaway friction greatly increases, a ratio of a force consumed in accordance with breakaway friction to a maximum rack force becomes high, and there may be a substantial burden on driving of the steering output actuator (30). In accordance with this, not only the lives of relating components decrease, but there may be an adverse effect also on traveling safety of the vehicle.

In consideration of such points, a configuration for internally detecting damages of the boots and corrosion of components according thereto inside the vehicle even if a driver does not take a separate vehicle maintenance and transmitting a warning message and the like in accordance with a result of the detection is necessary.

Figure 4:
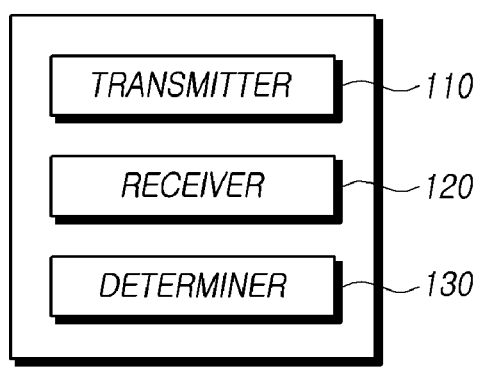
FIG. 4 is a block diagram illustrating a boots damage detection apparatus according to one embodiment of the present disclosure.

FIG. 4 is a block diagram illustrating the boots damage detection apparatus (10) according to one embodiment of the present disclosure.

Referring to FIG. 4, the boots damage detection apparatus (10) according to one embodiment of the present disclosure may include a transmitter (110), a receiver (120), a determiner (130), and the like.

The boots damage detection apparatus (10) according to one embodiment of the present disclosure may be an Advance Driver Assistance System (ADAS) that is mounted to a host vehicle, provides information assisting traveling of the host vehicle, and provides assistance to driver's control of the host vehicle. Here, the ADAS may represent cutting-edge driver assist systems of various types, and the driver assist system, for example, may include Autonomous Emergency Braking, a Smart Parking Assistance System (SPAS), a Blind Spot Detection (BSD) system, an Adaptive Cruise Control (ACC) system, a Lane Departure Warning System (LDWS), a Lane Keeping Assist System (LKAS), a Lane Change Assist System (LCAS), and the like. However, the driver assist system is not limited thereto.

The boots damage detection apparatus (10) may determine a degree of friction of the steering output actuator by comparing rack forces corresponding to rack positions and detect a damage of the boots (320).

The transmitter (110) may transmit a command current for moving to a first rack position or a second rack position.

More specifically, in a case where maintenance of the boots (320) is required, the transmitter (110) may transmit a command current such that the rack is moved to the first rack position or the second rack position set in advance. Here, as described above, the command current may be transmitted to a steering motor.

Such transmission of the command current may be periodically performed or may be performed by a driver in a key-on state. In the case of key-on, the rack may be moved without being interlocked with the steering wheel for preventing a damage of the boots (320). The receiver (120) may receive a rack position to which the rack is to move in accordance with a command current and a rack force corresponding to the rack position from a plurality of sensors.

Here, the plurality of sensors may include a rack position sensor and a rack force sensor, and the receiver (120) may receive a rack position from the rack position sensor and may receive a rack force from the rack force sensor.

The rack position sensor and the rack force sensor may be mounted to the host vehicle. The receiver (120) is not limited to the sensors described above and may receive detection information from a motor position sensor, a torque sensor, a current sensor, and the like.

The determiner (130) may determine damage/non-damage of the boots (320) based on a first rack force corresponding to the first rack position and a second rack force corresponding to the second rack position. Here, the first rack position and the second rack position may be selected as arbitrary positions within a movable range of the rack (32).

As one example, the first rack position and the second rack position may be set to different points having the same distance with reference to a center position of the rack (32) in different directions. In other words, the first rack position and the second rack position may be set to points symmetrical to each other with reference to the center position of the rack (32).

As one example, the first rack position and the second rack position may be set to two end positions of the rack (32). Also in this case, the first rack position and the second rack position may be set as being located to have the same distance in opposite directions with reference to the center position of the rack (32).

As one example, in a case where the steering output actuator (30) is in a normal state, absolute values of magnitudes of the first rack force and the second rack force respectively corresponding to the first rack position and the second rack position may be measured to be the same.

As one example, in a case where the steering output actuator (30) is in the normal state, absolute values of magnitudes of the first rack position and the second rack position respectively corresponding to the first rack force and the second rack force may be measured to be the same. In other words, the first rack position and the second rack position may be symmetrical to each other with reference to the center position of the rack (32).

In the present disclosure, measured values being the same does not mean only the same numerical values that are mathematically completely the same but measured values may be determined as being the same within an error range set in advance.

As another example, in a case where the steering output actuator (30) comes out of the normal state, the absolute values of the magnitudes of the first rack force and the second rack force respectively corresponding to the first rack position and the second rack position may be measured to be different values. In other words, even if the first rack position and the second rack positions are positions symmetrical to each other, the first rack force and the second rack force may be measured not to be symmetrical.

As a further another example, in a case where the steering output actuator (30) comes out of the normal state, the absolute values of the magnitudes of the first rack position and the second rack position respectively corresponding to the first rack force and the second rack force may be measured to be different values. In other words, although the first rack force and the second rack force are positions symmetrical to each other, the first rack position and the second rack position may be measured not to be symmetrical.

For example, in a case where the boots (320) enclosing connection portions between the rack (32) of the steering output actuator (30) and the wheel (33) are partially damaged, moisture flows into the inside thereof, and corrosion occurs, even if the first rack position and the second rack position are positions symmetrical to each other, the first rack force and the second rack force may be measured not to be symmetrical.

More specifically, damage/non-damage of the boots (320) may be determined through the first rack force for the rack (32) at the first rack position moved in accordance with the command current described above and the second rack force value for the rack (32) at the second rack position. The rack (32) is moved to the first rack position and the second rack position, and the receiver (120) may receive a rack force value corresponding to each rack position from the rack force sensor. The determiner (130) may determine damage/non-damage of the boots (320) based on such rack force values.

Figure 5:
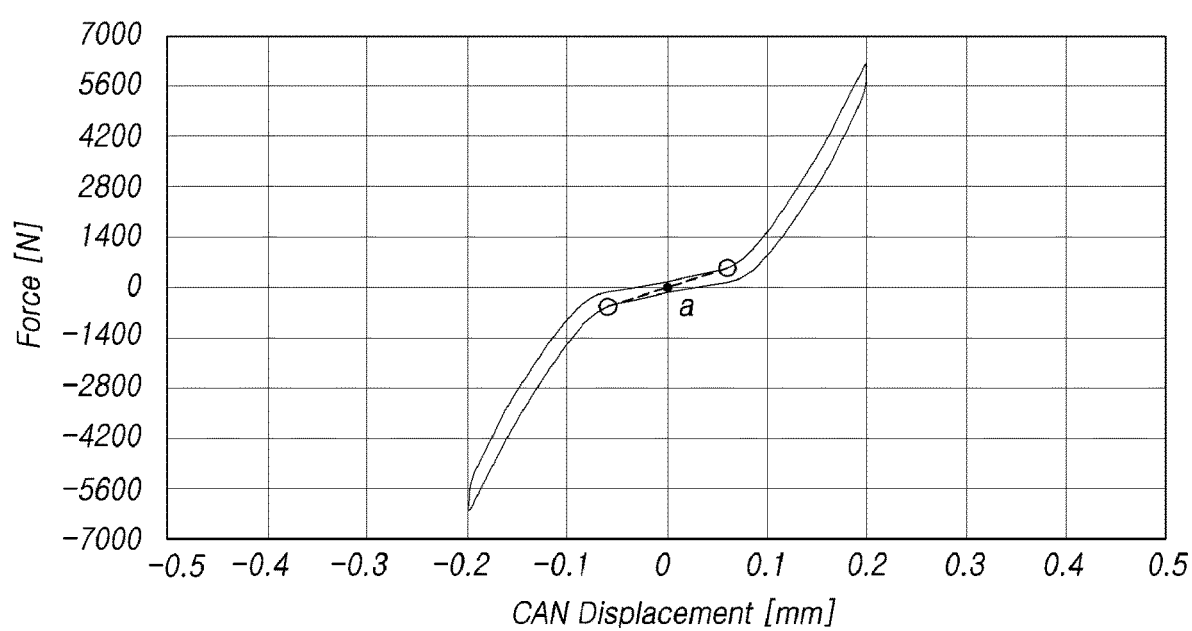
FIG. 5 is a diagram illustrating a rack force graph according to movement of a rack in a normal state of boots according to one embodiment.

FIG. 5 is a diagram illustrating a rack force graph according to movement of the rack in the normal state of the boots (320) according to one embodiment.

Referring to FIG. 5, in the normal state of the boots (320), the rack forces may be symmetrical with reference to a rack center point (a).

As one example, the first rack position may be symmetrical to the second rack position with reference to the rack center point (a). In accordance with this, the first rack force corresponding to the first rack position in the normal state of the boots (320) may have a direction opposite to the second rack force corresponding to the second rack position of the normal state and have the same magnitude as the second rack force.

As one example, the first rack force may be symmetrical to the second rack force with reference to the rack center point (a). In accordance with this, the first rack position corresponding to the first rack force in the normal state of the boots (320) may have a direction opposite to the second rack position corresponding to the second rack force of the normal state and the same magnitude as the second rack position.

In a case in which the absolute value of the first rack force is equal to or larger than a reference value set in advance, and the absolute value of the second rack force is equal to or larger than the reference value set in advance, the determiner (130) may determine damage/non-damage of the boots (320) based on the first rack position corresponding to the first rack force and the second rack position corresponding to the second rack force. As described above, in a case in which the first rack position and the second rack position are symmetrical to each other based on the center of the rack, the determiner (130) may determine that the boots (320) are normal.

For example, in a case in which the rack is moved in a direction of a first target rack position in accordance with a command current, the first rack force increases in accordance with the movement of the rack and reaches 50% of a maximum rack force, the rack moves in a direction of a second target rack position in accordance with a first rack position corresponding to the first rack force and the command current described above, and the second rack force increases in accordance with movement of the rack to reach 50% of the maximum rack force, not only the first rack position and the second rack position but also the first rack force and the second rack force may be measured to have directions opposite to each other with reference to the rack center point (a) and have the same magnitude. In other words, the first rack position and the second rack position and the first rack force and the second rack force may be symmetrical to each other.

Figure 6:
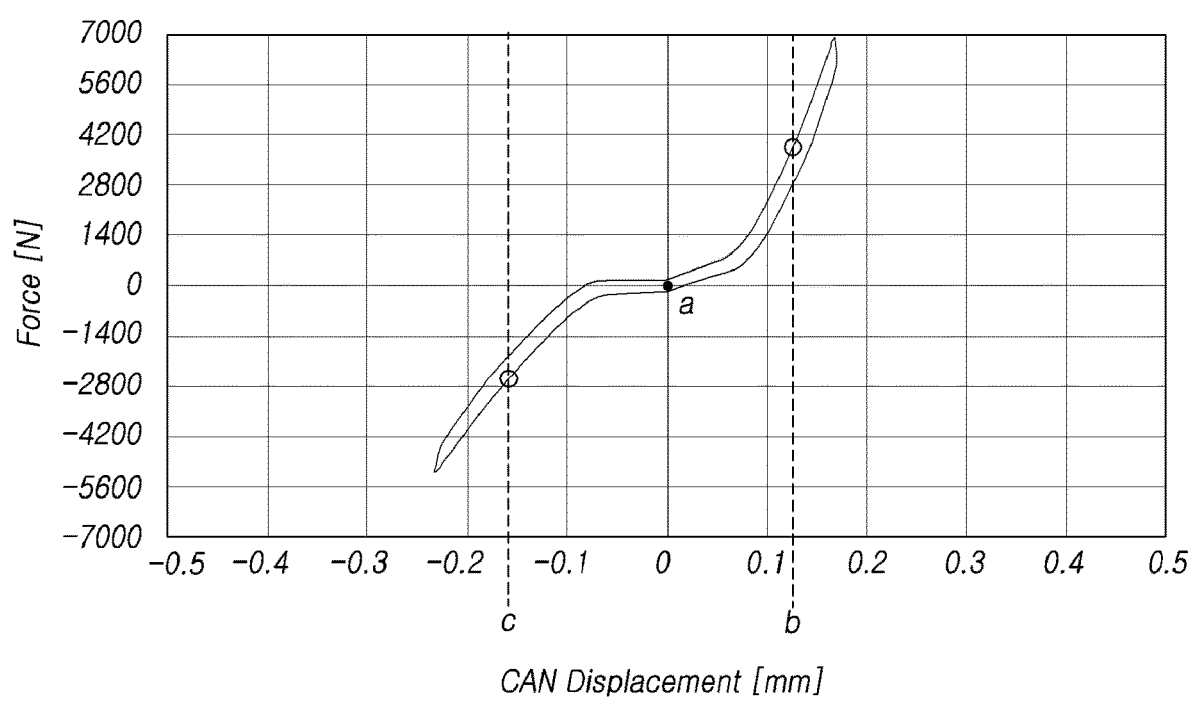
FIG. 6 is a diagram illustrating a rack force graph according to movement of a rack in a damaged state of boots according to one embodiment.

FIG. 6 is a diagram illustrating a rack force graph according to movement of the rack in a damaged state of the boots (320) according to one embodiment.

Referring to FIG. 6, different from the case there the boots (320) are in the normal state described above, the rack forces in a state in which the boots (320) are damaged may not be symmetrical to each other with reference to the rack center point (a). For example, in a state in which the boots (320) are damaged, in a case where the rack moves in a direction of a first target rack position in accordance with a command current, and the first rack force increases in accordance with the rack and reaches 50% of the maximum rack force, a rack position corresponding to such a first rack force may be measured to be a first rack position (b). Then, in a case where the rack moves in a direction of a second target rack position in accordance with the command current described above, and the second rack force increases in accordance with movement of the rack and reaches 50% of the maximum rack force, a rack position corresponding to such a second rack force may be measured to be a second rack position (c).

The first rack position (a) and the second rack position (b) may have mutually-different magnitudes with reference to the rack center point (a). In other words, the first rack position (a) and the second rack position (b) may be asymmetrical to each other with reference to the rack center point (a).

Thus, in a case where the first rack position and the second rack position are asymmetrical to each other based on the center of the rack (32), the determiner (130) may determine that the boots (320) are damaged.

To sum up, in a case where the boots (320) are damaged, in other words, in a case where moisture or the like is injected into the steering output actuator (30) due to damages of the boots (320), the breakaway friction increases, and a more rack force may be required for moving the rack (32) than in the case of the boots (320) that are in the normal state. Thus, the boots damage detection apparatus (10) may determine damage/non-damage of the boots (320) using a case where the rack force is greatly generated.

The point symmetry between the first rack force and the second rack force described above represents a case of the boots (320) being in the normal state, in other words, an ideal case, and symmetry/non-symmetry may be determined using approximated values set in advance for an actual application.

The boots damage detection apparatus (10) may further include an outputter that notifies a driver of the damage of the boots (320) in a case where the boots (320) are determined to be in a damaged state.

The outputter may output information corresponding to the damage of the boots (320) described above. For example, the outputter may be realized using a navigation arranged inside the vehicle and may output information corresponding to a damage of the boots (320) to a display panel of the navigation using a combination of a character string and a number string. In addition, the outputter may output the combination of the character string and the number string described above through a speaker mounted to the host vehicle.

Hereinafter, a boots damage detection method using the boots damage detection apparatus (10) that can perform all the disclosures described above will be described.

Figure 7:
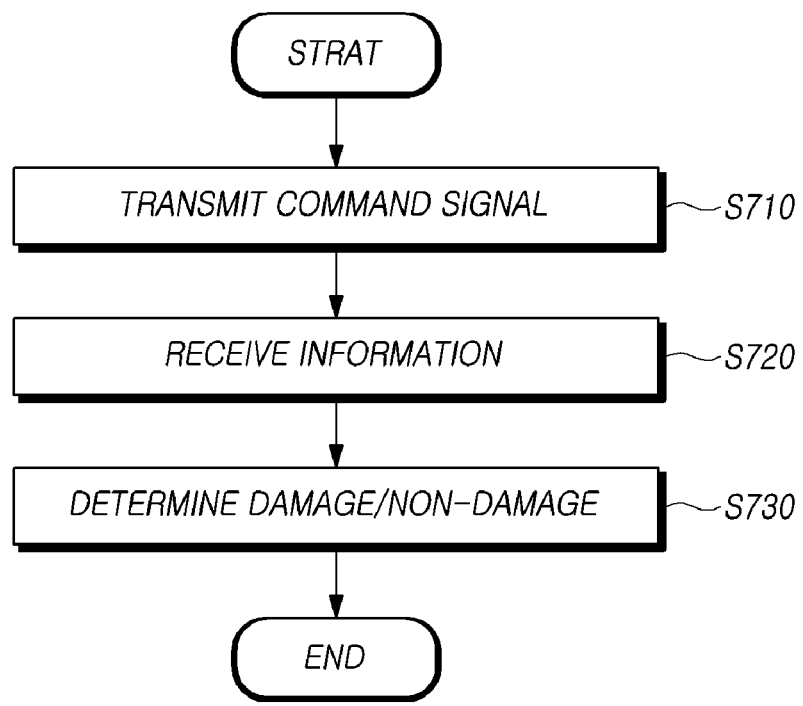
FIG. 7 is a flowchart illustrating a boots damage detection method according to one embodiment of the present disclosure.

FIG. 7 is a flowchart illustrating a boots damage detection method according to one embodiment of the present disclosure.

Referring to FIG. 7, the boots damage detection method according to the present disclosure may include: a command current transmitting step (S710) of transmitting a command current for a movement to a first rack position or a second rack position; an information receiving step (S720) of receiving a rack position to which a movement is performed in accordance with the command current and a rack force corresponding to the rack position from a plurality of sensors; and a damage/non-damage determining step (S730) of determining damage/non-damage of boots (320) based on a first rack force corresponding to the first rack position and a second rack force corresponding to the second rack position.

Here, the first rack position may be symmetrical to the second rack position with reference to a center of the rack (32).

In addition, in the information receiving step (S720), the rack position may be received from a rack position sensor, and the rack force may be received from a rack force sensor.

Figure 8:
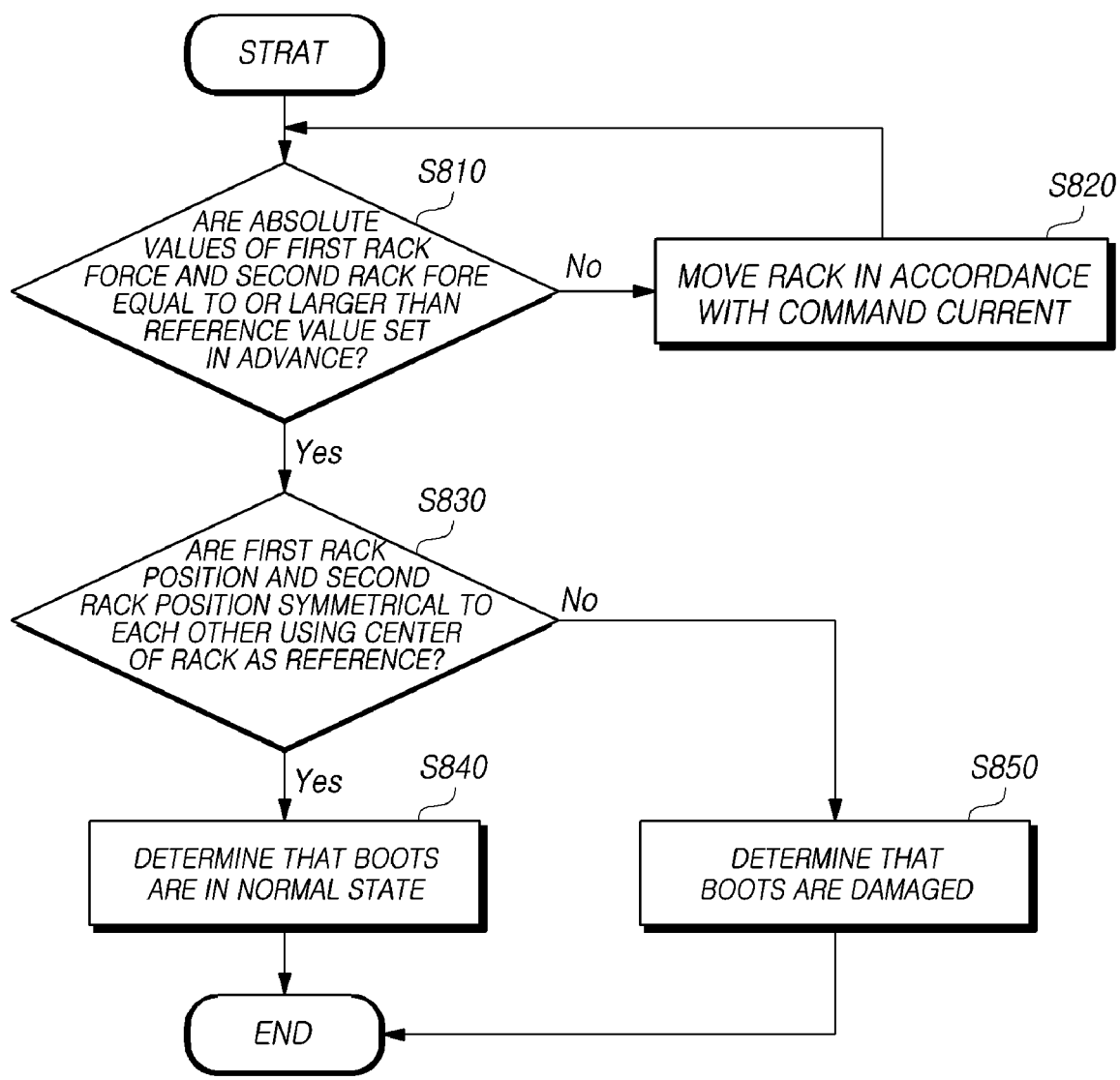
FIG. 8 is a diagram illustrating a damage/non-damage determining step according to one embodiment more specifically.

FIG. 8 is a diagram illustrating the damage/non-damage determining step according to one embodiment more specifically.

Referring to FIG. 8, the boots damage detection apparatus (10) may determine whether or not the absolute values of the first rack force and the second rack force are equal to or larger than a reference value set in advance (S810). Here, the reference value set in advance, for example, may be 50% of a maximum rack force.

In a case where the absolute values of the first rack force and the second rack force are smaller than the reference value set in advance (No in S710), the rack (32) may be moved to a target rack position in accordance with the command current (S820).

On the other hand, in a case where the absolute values of the first rack force and the second rack force are equal to or larger than the reference value set in advance, the boots damage detection apparatus (10) may determine whether or not the first rack position and the second rack position are symmetrical to each other with reference to the center of the rack (S830). As described above, in a case in which a damage occurs in the boots (320), foreign materials such as moisture and the like are injected into the steering output actuator (30), rust is formed in gears, bearings, and the like, and breakaway friction may increase in accordance therewith. If the breakaway friction increases, a rack force required for moving the rack (32) may increase.

In a case where the first rack position and the second rack position are symmetrical to each other with reference to the center of the rack (Yes in S730), the boots damage detection apparatus (10) can determine that there is no damage in the boots (320), in other words, the normal state (S840).

On the other hand, in a case where the first rack position and the second rack position are not symmetrical to each other with reference to the center of the rack (No in S830), the boots damage detection apparatus (10) can determine that a damage occurs in the boots (320) (S850). The boots damage detection method may further include an output step of notifying a driver of a damage of the boots (320) in a case where an occurrence of the damage in the boots (320) is determined.

As described above, according to the present disclosure, in the boots damage detection apparatus (10) and the method, damage/non-damage of the boots (320) can be determined by comparing rack forces corresponding to specific rack positions in a mechanically-divided SbW system.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

REFERENCE SIGNS LIST

1: steering assist system
10: boots damage detection apparatus
20: steering input actuator
30: steering output actuator
110: transmitter
120: receiver
130: determiner
310: rack housing
320: boots

What is claimed is:

1. A boots damage detection apparatus comprising:
a transmitter that transmits a command current for a movement to a first rack position or a second rack position;
a receiver that receives a rack position to which a movement is performed in accordance with the command current and a rack force corresponding to the rack position from a plurality of sensors; and a determiner that determines damage/non-damage of boots based on a first rack force corresponding to the first rack position and a second rack force corresponding to the second rack position.

2. The boots damage detection apparatus according to claim 1, wherein the first rack position is symmetrical to the second rack position using a center of a rack as a reference.

3. The boots damage detection apparatus according to claim 1, wherein the determiner determines that the boots are normal in a case where absolute values of the first rack force and the second rack force are the same.

4. The boots damage detection apparatus according to claim 1, wherein, in a case where an absolute value of the first rack force is equal to or larger than a reference value set in advance, and an absolute value of the second rack force is equal to or larger than the reference value set in advance, the determiner determines damage/non-damage of the boots based on the first rack position corresponding to the first rack force and the second rack position corresponding to the second rack force.

5. The boots damage detection apparatus according to claim 4, wherein the determiner determines damage/non-damage of the boots based on the first rack position and the second rack position and determines that the boots are normal in a case where the first rack position and the second rack position are symmetrical to each other based on a center of a rack.

6. The boots damage detection apparatus according to claim 1, wherein the receiver receives the rack position from a rack position sensor and receives the rack force from a rack force sensor.

7. A boots damage detection method comprising:
transmitting a command current for a movement to a first rack position or a second rack position;

receiving a rack position to which a movement is performed in accordance with the command current and a rack force corresponding to the rack position from a plurality of sensors; and determining damage/non-damage of boots based on a first rack force corresponding to the first rack position and a second rack force corresponding to the second rack position.

8. The boots damage detection method according to claim 7, wherein the first rack position is symmetrical to the second rack position using a center of a rack as a reference.

9. The boots damage detection method according to claim 7, wherein, in the determining of damage/non-damage, the boots are determined to be normal in a case where absolute values of the first rack force and the second rack force are the same.

10. The boots damage detection method according to claim 7, wherein, in the determining of damage/non-damage, in a case where an absolute value of the first rack force is equal to or larger than a reference value set in advance, and an absolute value of the second rack force is equal to or larger than the reference value set in advance, damage/non-damage of the boots is determined based on the first rack position corresponding to the first rack force and the second rack position corresponding to the second rack force.

11. The boots damage detection method according to claim 10, wherein, in the determining of damage/non-damage, damage/non-damage of the boots is determined based on the first rack position and the second rack position, and the boots are determined to be normal in a case where the first rack position and the second rack position are symmetrical to each other based on a center of a rack.

12. The boots damage detection method according to claim 7, wherein, in the receiving of a rack position and a rack force, the rack position is received from a rack position sensor, and the rack force is received from a rack force sensor.

* * * * *